United States Patent
Yamamoto

(10) Patent No.: US 8,351,093 B2
(45) Date of Patent: Jan. 8, 2013

(54) IMAGE READING SYSTEM AND APPARATUS AND METHOD OF READING IMAGE

(75) Inventor: Hiroyuki Yamamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 500 days.

(21) Appl. No.: 12/633,554

(22) Filed: Dec. 8, 2009

(65) Prior Publication Data

US 2010/0142012 A1    Jun. 10, 2010

(30) Foreign Application Priority Data

Dec. 10, 2008    (JP) ................................. 2008-314616

(51) Int. Cl.
*H04N 1/04* (2006.01)

(52) U.S. Cl. ........ 358/474; 358/498; 358/453; 358/496; 399/370

(58) Field of Classification Search .................. 358/474, 358/498, 453, 488, 496, 486, 437, 413; 399/370, 399/376

See application file for complete search history.

(56) References Cited

U.S. PATENT DOCUMENTS

| | | | | |
|---|---|---|---|---|
| 5,857,130 A * | 1/1999 | Ueda et al. | ....................... | 399/17 |
| 5,905,582 A * | 5/1999 | Hirai et al. | ..................... | 358/468 |
| 6,051,826 A * | 4/2000 | Arimoto et al. | ............ | 250/208.1 |
| 6,963,429 B2 * | 11/2005 | Suzuki et al. | .................. | 358/474 |
| 6,968,086 B1 * | 11/2005 | Fukuhara et al. | ............. | 382/233 |
| 7,197,254 B2 * | 3/2007 | Tomita et al. | .................... | 399/49 |
| 7,298,910 B2 * | 11/2007 | Fukuhara et al. | ............. | 382/233 |
| 7,502,147 B2 * | 3/2009 | Suzuki et al. | .................. | 358/504 |
| 7,843,610 B2 * | 11/2010 | Hoshi | ............................ | 358/474 |
| 7,995,866 B2 * | 8/2011 | Nagahashi | .................... | 382/296 |
| 8,125,655 B2 * | 2/2012 | Katsuyama | .................. | 358/1.12 |
| 8,275,185 B2 * | 9/2012 | Weng et al. | ................... | 382/128 |
| 2006/0012495 A1 * | 1/2006 | Fukuhara et al. | ............... | 341/50 |
| 2012/0057211 A1 * | 3/2012 | Shirado | ........................ | 358/475 |

FOREIGN PATENT DOCUMENTS

| | | | |
|---|---|---|---|
| JP | 2780292 B2 | 6/1990 | |
| JP | 2001-298588 A | 10/2001 | |

* cited by examiner

*Primary Examiner* — Negussie Worku
(74) *Attorney, Agent, or Firm* — Canon U.S.A., Inc. IP Division

(57) ABSTRACT

The leading edge and the trailing edge of an original document are detected with a sheet detection sensor provided in an automatic document feeding device, reading out of the original document is started from a position a predetermined distance before the position where the leading edge of the original document passes a reading position in an image reading apparatus, and reading out thereof is terminated at a position a predetermined distance after the position where the trailing edge of the original document passes the reading position. It is determined whether the apices of a rectangular area extracted from an image area that is read out are included in the respective areas of a predetermined height from the leading end and the trailing end of the image area to determine whether the size of the document image area is the same as the sheet size of the original document.

6 Claims, 10 Drawing Sheets

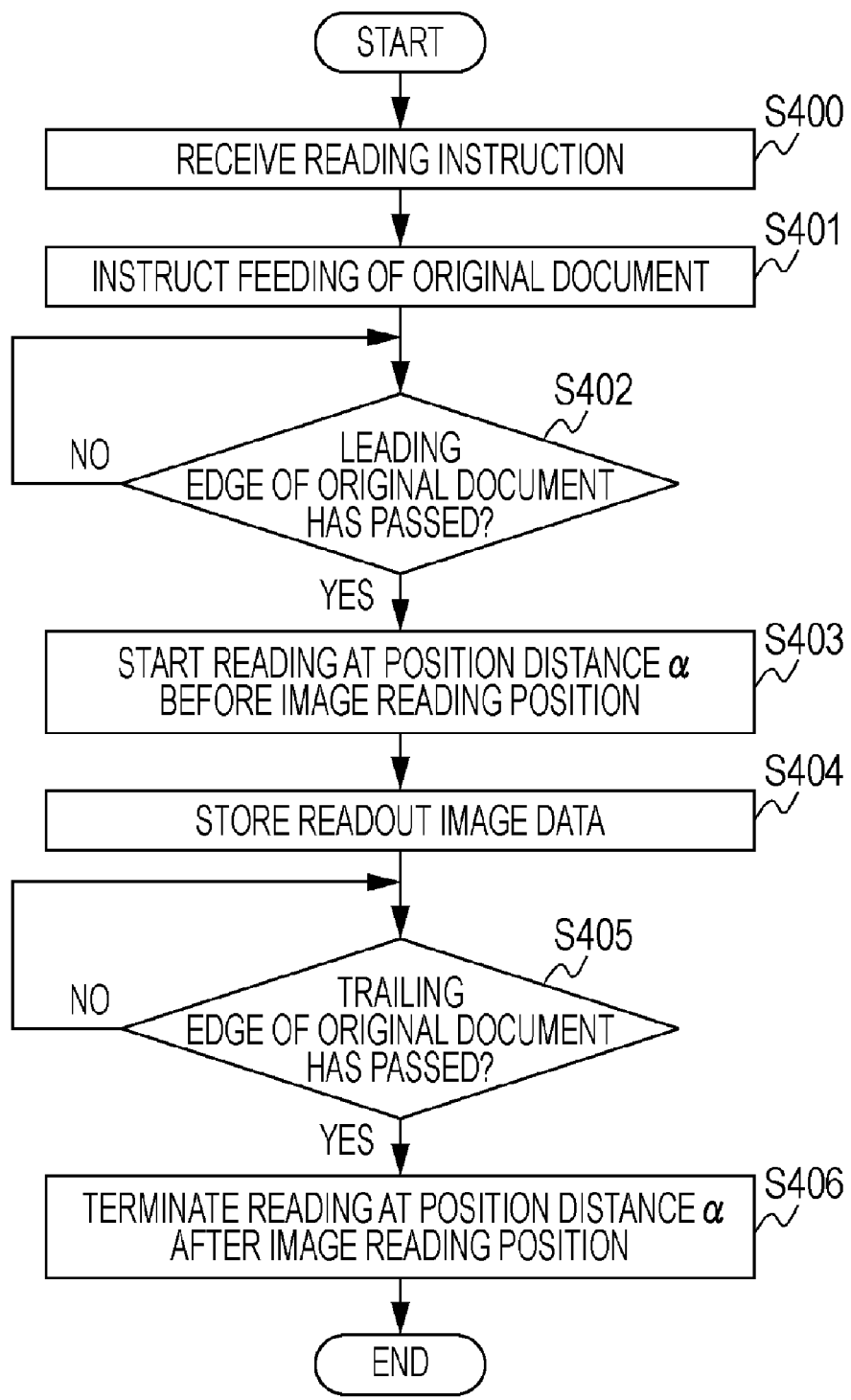

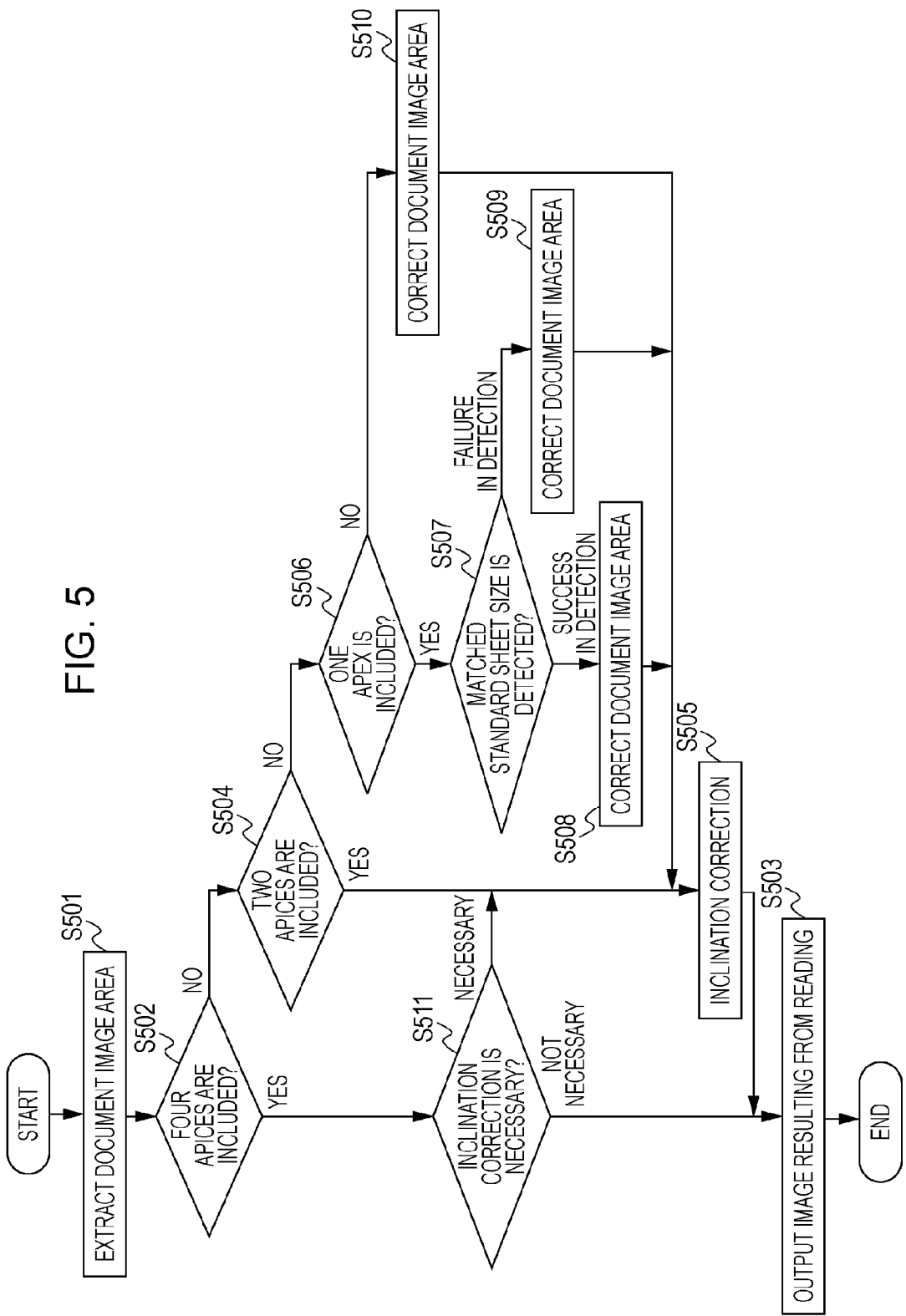

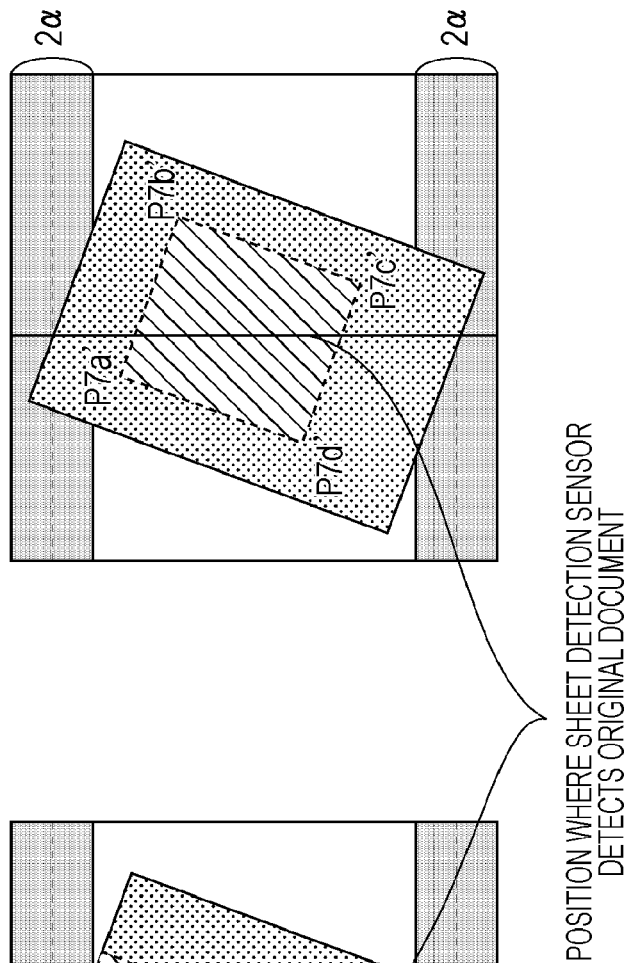

FIG. 8
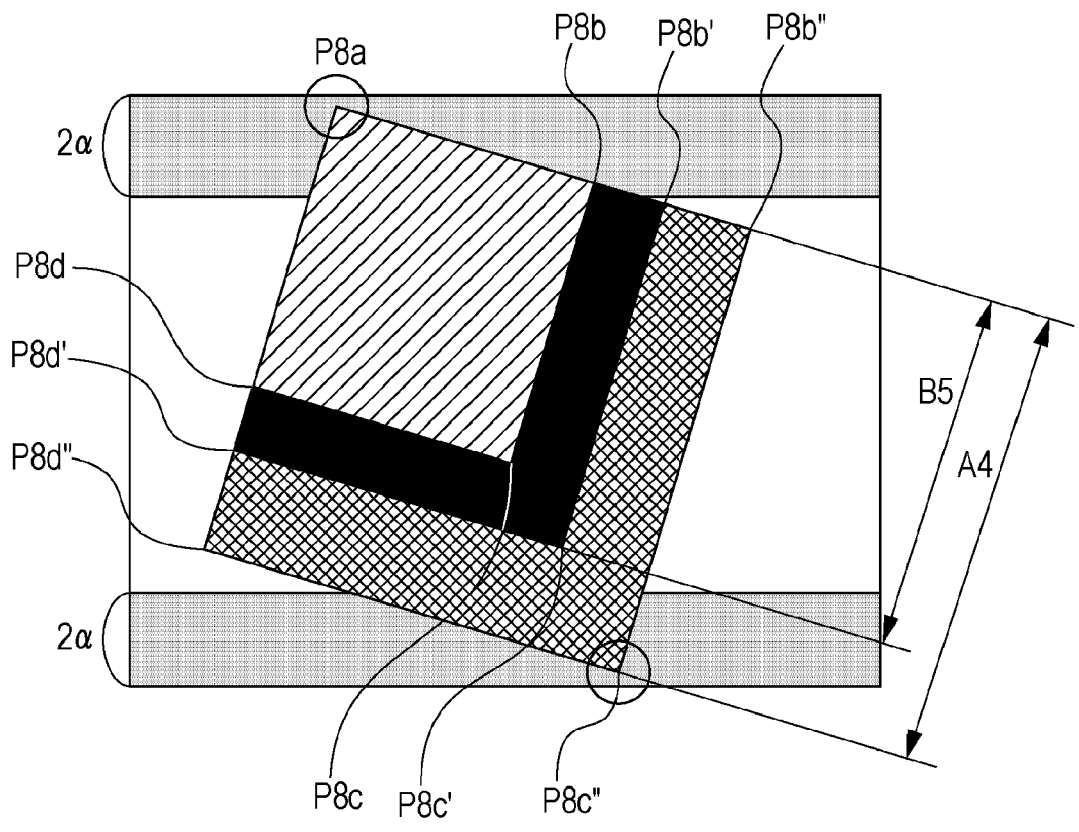
 DOCUMENT IMAGE AREA
 EXAMPLE OF STANDARD SHEET SIZE DETERMINED TO BE UNMATCHED
 EXAMPLE OF STANDARD SHEET SIZE DETERMINED TO BE MATCHED FIG. 9
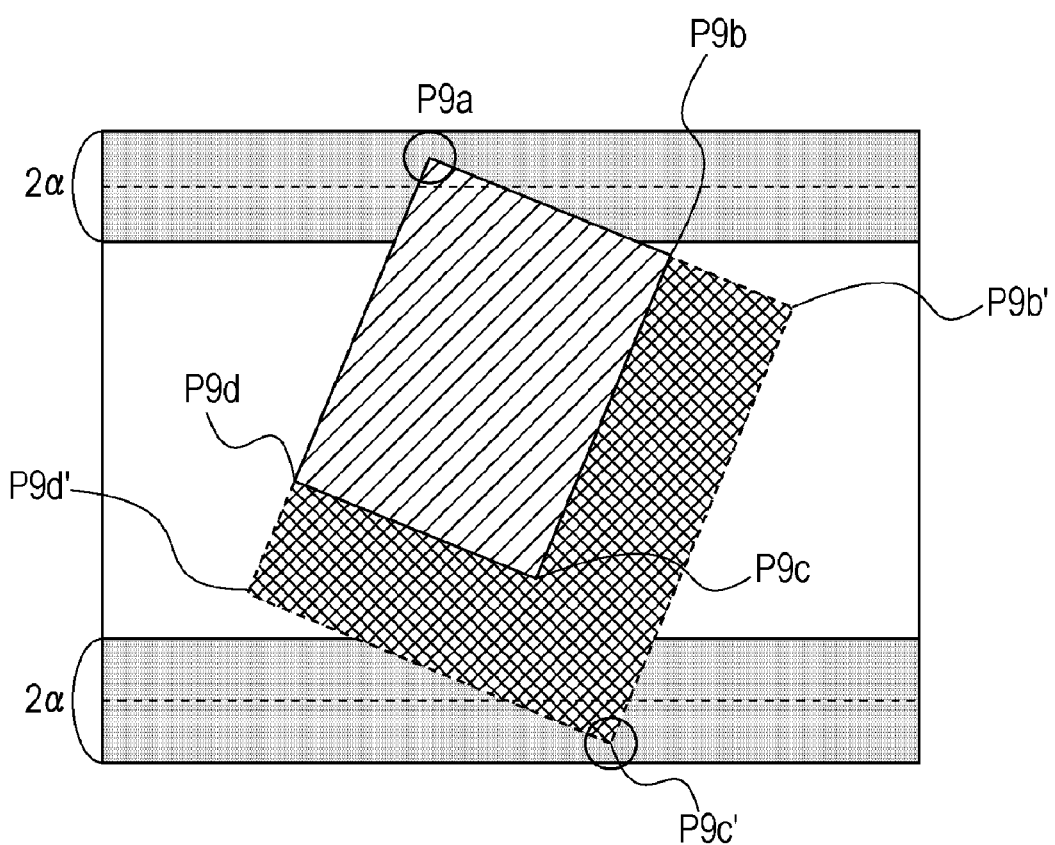
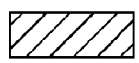 DOCUMENT IMAGE AREA
 DOCUMENT IMAGE AREA ESTIMATED BY ESTIMATION OF DOCUMENT AREA FIG. 10
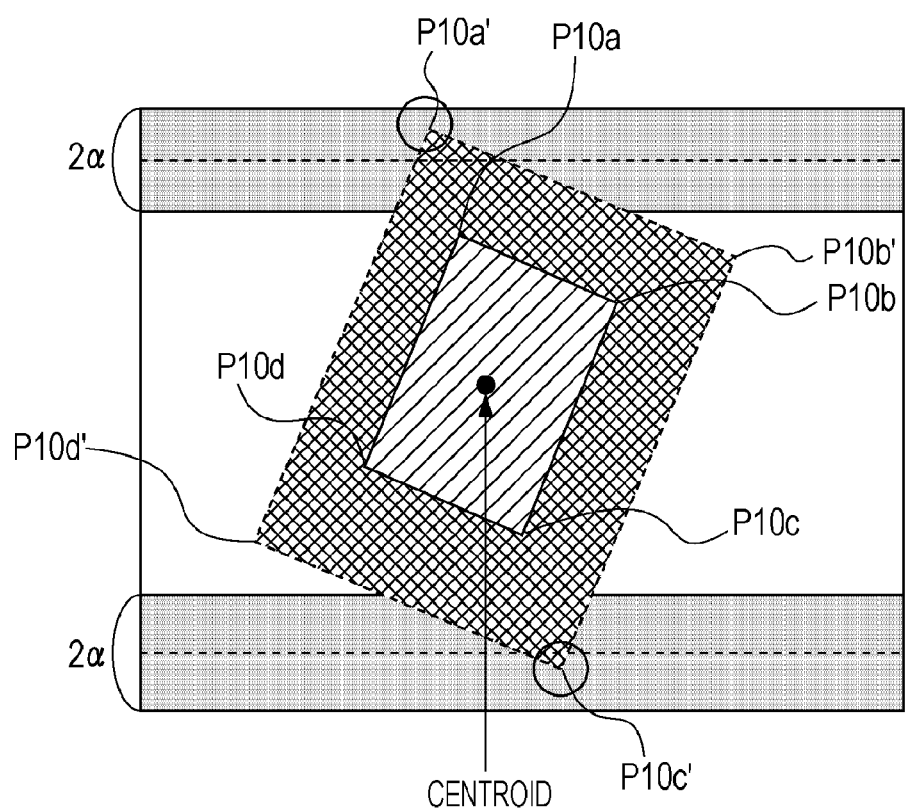
 DOCUMENT IMAGE AREA
 NEW DOCUMENT IMAGE AREA ESTIMATED BY ESTIMATION OF DOCUMENT AREA

IMAGE READING SYSTEM AND APPARATUS AND METHOD OF READING IMAGE

BACKGROUND OF THE INVENTION

1. Field of the Invention

The present invention relates to a technology to determine whether a document area that is extracted from image data read out by an image reading apparatus including an automatic document feeding device is correct for the sheet size of an original document.

2. Description of the Related Art

Japanese Patent No. 2780292 discloses a method of detecting the sheet size of an original document by a dedicated sensor for detecting the width of the original document that is read out in an image reading apparatus including an automatic document feeding device. A method of extracting a document area from edge information acquired from an image area read out by an image reading apparatus to detect the sheet size of an original document is also disclosed.

In addition, Japanese Patent Laid-Open No. 2001-298588 discloses a technology in which the sheet size of an original document is detected by a dedicated sensor in an automatic document feeding device or is input by a user. Furthermore, a method is disclosed in which image information about an original document read out by an image reading apparatus is compared with the sheet size of the original document to set a reading range and the inclination of the original document is corrected on the basis of image data that is read out to cut out the image in the reading range.

However, the cost is increased to provide the dedicated sensor for detecting the sheet size of an original document in the automatic document feeding device, as in Japanese Patent Laid-Open No. 2001-298588, so that it is disadvantageously difficult to realize an inexpensive product. In addition, the edge may not be extracted depending on reading conditions, etc. with the method of extracting a document area by using the edge information about image data that is read out. In such a case, there is a problem in that an image of the extracted document area is not matched with the sheet size of the original document and, thus, the image of the correct document area cannot be acquired.

SUMMARY OF THE INVENTION

In order to resolve the above problem, it is determined whether a document image area extracted from an image area that is read out is correct for the sheet size of an original document, without providing dedicated hardware (sensor) for detecting the sheet size of the original document in an automatic document feeding device in an image reading apparatus. In addition, the size of the area resulting from the extraction is changed to a sheet size that is probably more correct, if it is determined that the extraction fails, to improve the precision of the extraction.

According to an embodiment of the present invention, an image reading system including an image reading apparatus that includes a reading unit reading out an original document, a document feeding unit feeding the original document to an image reading position in the reading unit, and a sheet detecting unit that is arranged upstream of the image reading position on a document feeding path of the document feeding unit and that detects passing of the original document includes a start-of-reading instructing unit which instructs the reading unit to start reading at a position a predetermined distance before the position where a leading edge of the original document detected by the sheet detecting unit passes the image reading position; a termination-of-reading instructing unit which instructs the reading unit to terminate reading at a position a predetermined distance after the position where a trailing edge of the original document detected by the sheet detecting unit passes the image reading position; an extracting unit which extracts a rectangular area indicating a document image area of the original document from image data read out by the reading unit; an acquiring unit which acquires the number of apices of the rectangular area included in specific areas including a leading end and a trailing end of the image data; a determining unit which determines a sheet size of the original document on the basis of the result of the acquisition by the acquiring unit; and an output unit which outputs a rectangular area resulting from correction of the rectangular area to the sheet size of the original document determined by the determining unit as the document image area.

According to the present invention, it is possible to correctly extract a document image area even in the image reading apparatus provided with the automatic document feeding device that does not include a dedicated sensor (hardware) for detecting the size of an original document. In addition, even if the extraction of the document image area fails, the size of the extracted area can be changed to a sheet size that is probably more correct to improve the precision of the extraction.

Further features of the present invention will become apparent from the following description of exemplary embodiments with reference to the attached drawings.

BRIEF DESCRIPTION OF THE DRAWINGS

FIG. 4 is a flowchart showing an example of a process of reading out an original document according to the embodiment of the present invention.

FIG. 5 is a flowchart showing an example of a document-image-area extracting process according to the embodiment of the present invention.

FIGS. 7A and 7B illustrate other examples of how to determine the result of image processing according to the embodiment of the present invention.

FIG. 8 illustrates an example of how to detect a document size.

FIG. 9 illustrates another example of how to detect a document size.

FIG. 10 illustrates another example of how to detect a document size.

DESCRIPTION OF THE EMBODIMENTS

Figure 1:
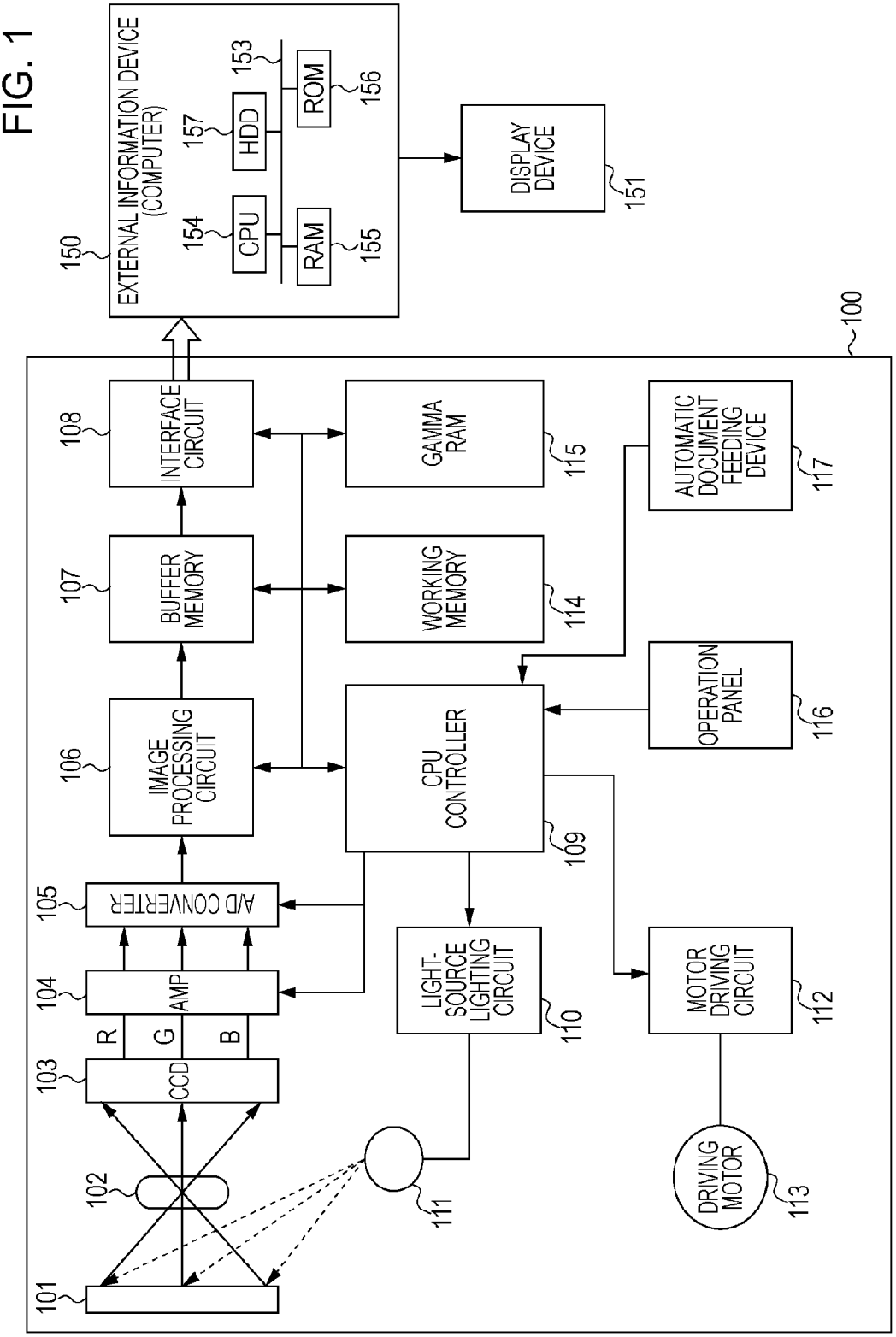
FIG. 1 is a block diagram showing an example of the configuration of a system according to an embodiment of the present invention.

Other features, objects, and advantages of the present invention will be apparent from the following description when taken in conjunction with the accompanying drawings, in which like reference characters designate the same or similar parts throughout the figures thereof.

FIG. 1 is a block diagram showing an example of the configuration of an image reading system according to a first embodiment of the present invention. Referring to FIG. 1, reference numeral 100 denotes an image reading apparatus and reference numeral 101 denotes an original document to be read out. When the original document 101 is irradiated with light from a light source lamp 111, reflected light of a light intensity corresponding to the color density of the surface of the original document is incident on a line image sensor 103, such as a charge coupled device (CCD) sensor, which is a solid-state image pickup device through an imaging lens 102 to form an image. A light-source lighting circuit 110 drives and turns on the light source lamp 111. An amplifier 104 amplifies an analog image signal output from the line image sensor 103. A motor driving circuit 112 drives an optical drive motor 113, such as a stepper motor. The motor driving circuit 112 outputs an excitation signal for the drive motor 113 in response to a control signal from a central processing unit (CPU) controller 109 serving as a control unit of the image reading apparatus 100. An analog-to-digital (A/D) converter 105 converts the analog image signal supplied from the amplifier 104 into a digital image signal. An image processing circuit 106 performs image processing including offset correction, shading correction, digital gain control, color balance adjustment, color masking, resolution conversion in the main and secondary scanning directions, etc. on the digital image signal supplied from the A/D converter 105. A buffer memory 107, which is a random access memory (RAM), temporarily stores image data. An interface circuit 108 serves as an interface with an external information device 150 to transmit commands and perform image communication. A small computer system interface (SCSI), a parallel interface, a universal serial bus (USB) interface, an IEEE1394 interface, a local area network (LAN) interface, a wireless LAN interface, or the like is used as the interface circuit 108. A working memory 114 is used as a temporary working memory when the image processing circuit 106 performs the image processing. The working memory 114 is used for, for example, correction of offset between RGB lines of the image signal from each of RGB line sensors that are arranged in parallel on the line image sensor 103 with a predetermined offset. In addition, the working memory 114 temporarily stores a variety of data for, for example, the shading correction. A gamma RAM 115 stores a gamma conversion lookup table (LUT) to perform gamma correction. The CPU controller 109 controls the image reading apparatus 100 in accordance with an instruction from the external information device 150. Specifically, the CPU controller 109 controls the motor driving circuit 112, the light-source lighting circuit 110, the image processing circuit 106, and so on. In addition, the CPU controller 109 detects a state in which a switch in an operation panel 116 is pressed to notify the external information device 150 of the state through the interface circuit 108. Although the image reading apparatus 100 of the first embodiment includes the three-line CCD sensor 103 reading three colors: red (R), green (G), and blue (B) and the white light source lamp 111, a function similar to that of the image reading apparatus 100 can be realized with a configuration including a single-color single-line image sensor and light source lamps of the three RGB colors that can be selectively turned on. For example, light emitting diodes (LEDs) of the three colors are used as the light source, and the CPU controller turns on the LED of one color, among the light source LEDs of the three colors, with the light-source lighting circuit to read out an image formed by using the one-color LED that is turned on with the image sensor. Reading an image while sequentially switching the LED that is turned on allows the image of the original document to be subjected to color separation with the color of the light source LED that is turned on in order to read out the image. An automatic document feeding device 117 feeds the original document 101 to a predetermined document reading position.

The external information device 150 is a host computer, such as a personal computer, and is connected to a display device 151. The external information device 150 includes a CPU 154 serving as an arithmetic unit, a RAM 155, a read only memory (ROM) 156, and a hard disk drive (HDD) 157 serving as a storage area, which are connected to each other via a system bus 153. Various application programs, in addition to an operating system (OS), are stored in the HDD 157. The various memories are used as working areas where the application programs loaded from the HDD 157 are processed.

Figure 2:
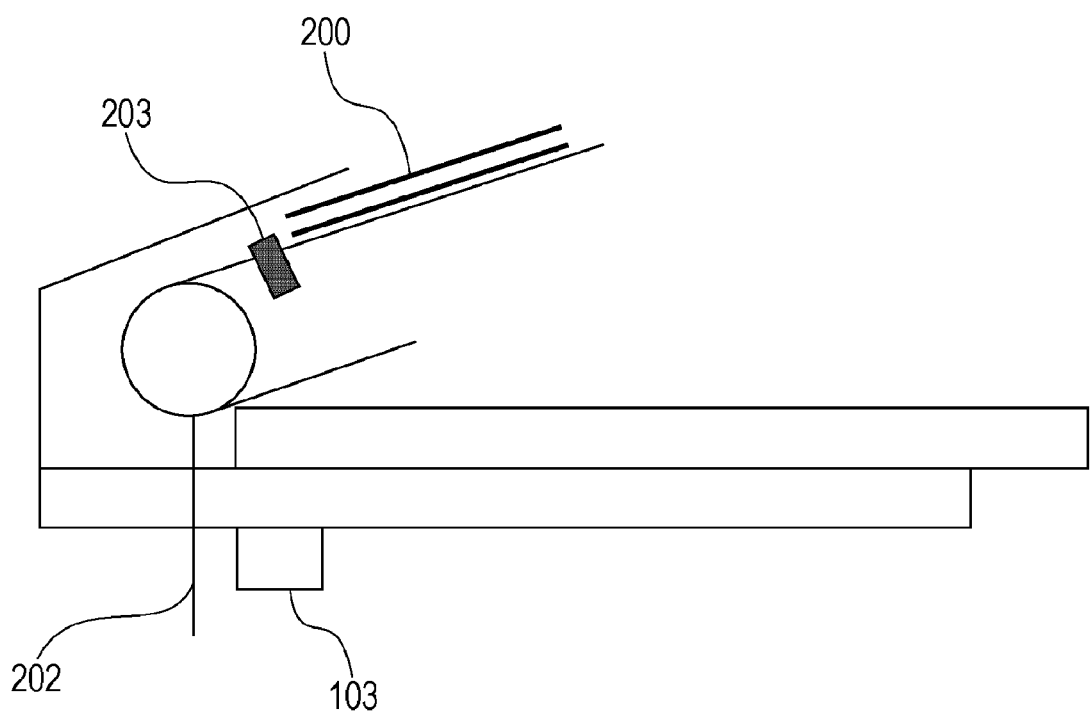
FIG. 2 illustrates an example of the configuration of an automatic document feeding device in an image reading apparatus according to the embodiment of the present invention.

FIG. 2 illustrates an example of the configuration of the automatic document feeding device 117 in the image reading apparatus 100. Referring to FIG. 2, an original document 200 to be read is loaded on the automatic document feeding device 117. Reference numeral 202 denotes an image reading position where the line image sensor 103 reads out the original document 200. Reference numeral 203 denotes a sheet detection sensor that detects passing of the leading edge and the trailing edge of the original document 200. In the reading out of the original document 200 loaded at a document loading position in the automatic document feeding device 117, the line image sensor 103 moves to the image reading position 202 where the original document 200 is read out. The sheet detection sensor 203 is arranged upstream of the image reading position 202.

Figure 3:
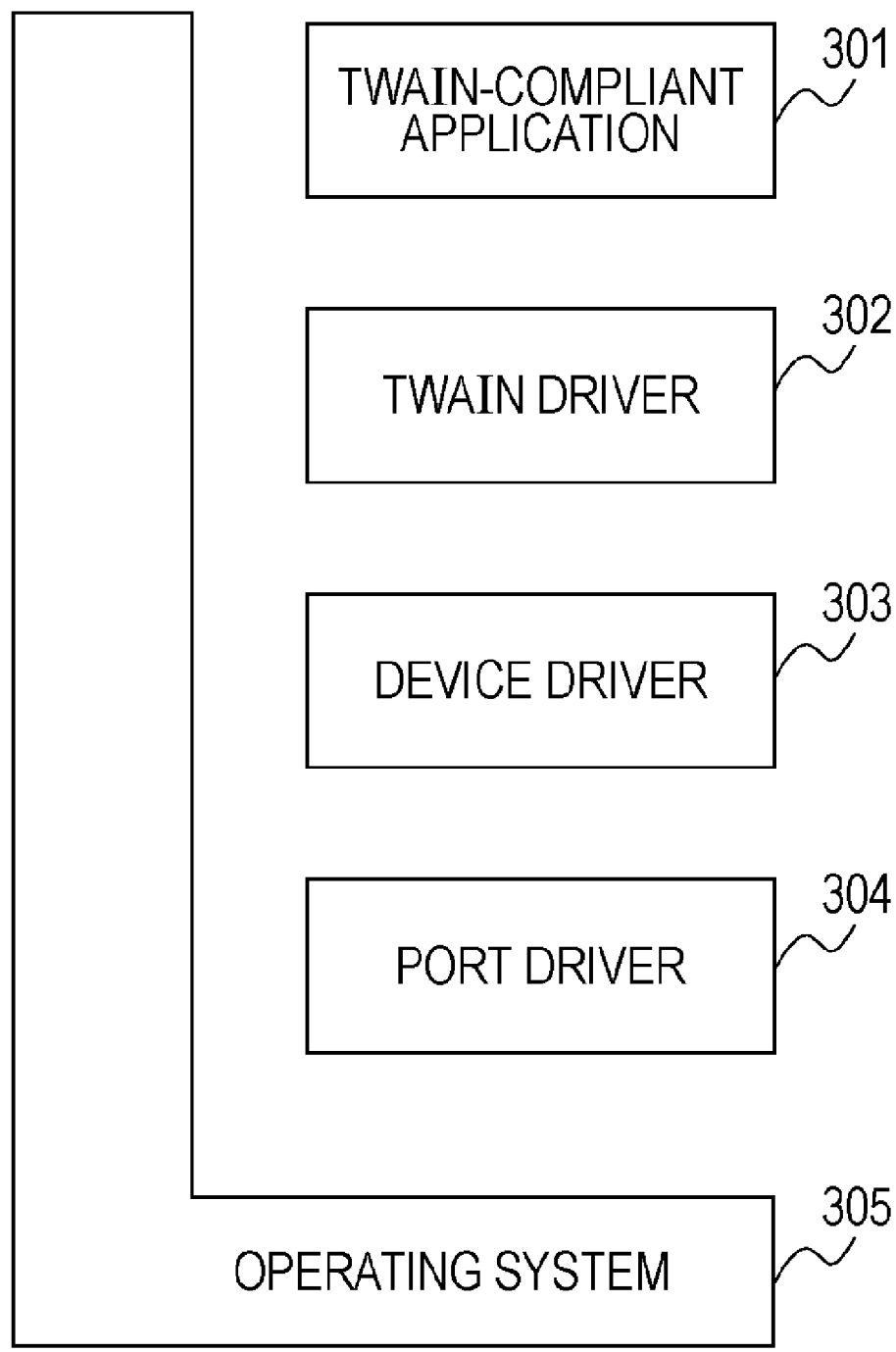
FIG. 3 is a block diagram showing an example of the internal configuration of an external information device (computer) according to the embodiment of the present invention.

FIG. 3 is a block diagram showing an example of the internal configuration of the external information device 150. Referring to FIG. 3, the external information device 150 includes a Tool Without An Interesting Name (TWAIN)-compliant application 301, a TWAIN driver 302, a device driver 303, a port driver 304, and an operating system 305. The TWAIN-compliant application 301 reads out an image from the image reading apparatus 100 through the TWAIN driver 302 to display the readout image in the display device 151. In addition, the TWAIN-compliant application 301 has a function of processing and storing an image in response to an instruction from a user. The TWAIN driver 302 conforms to the TWAIN standard. The TWAIN driver 302 passes the image from the image reading apparatus 100 to the TWAIN-compliant application 301 and displays a specific graphical user interface (GUI). The GUI has a preview function, a function of specifying a crop area for a preview image, a function of setting the resolution, a function of setting a reading mode (binary mode, multi-value mode such as eight-bit mode or 24-bit mode, etc.), a function of making settings of color control such as gamma correction, and so on.

The device driver 303 accesses a control register for each module in the image reading apparatus 100 to control the shading, to set the motor speed in accordance with the resolution or the crop area, to transmit gamma correction data received from the TWAIN driver 302 to the image reading apparatus 100, and to control an image reading flow. The port driver 304 controls communication with the image reading apparatus 100 in accordance with the interface, such as the parallel interface, the SCSI interface, the USB interface, or the IEEE1394 interface. The operating system 305 is, for example, Windows®.

FIG. 4 is a flowchart showing an example of a process of reading out the original document 200 by the image reading apparatus 100. Referring to FIG. 4, in Step S400, the CPU controller 109 in the image reading apparatus 100 receives a reading instruction from the external information device 150 through the interface circuit 108. In response to the received reading instruction, in Step S401, the CPU controller 109 instructs the automatic document feeding device 117 to feed the original document 200 to be read to the image reading position 202.

In Step S402, the CPU controller 109 waits for a notification of passing of the leading edge of the original document 200 fed on a document feed path from the sheet detection sensor 203 in the automatic document feeding device 117.

In response to reception of the notification of passing of the leading edge of the original document 200 from the sheet detection sensor 203, in Step S403, the CPU controller 109 calculates a time when the leading edge of the original document passes the position a predetermined distance α before the image reading position 202 from the distance between the sheet detection sensor 203 and the image reading position 202 and the paper feed speed in the automatic document feeding device 117. The CPU controller 109 instructs the line image sensor 103 to start reading of an image at the calculated time to start the reading at the position the predetermined distance α before the position where the leading edge of the original document 200 exists. The distance α is set in advance from the difference between the actual position of the leading edge of the original document 200 and the position of the leading edge of the original document, detected by the sheet detection sensor 203 if the original document is fed at a tilt from the automatic document feeding device 117. The distance α may be set for the image reading apparatus 100 by the TWAIN driver 302 each time the instruction to start the reading is issued. The width of reading is set to a maximum reading width of the line image sensor 103. The instruction to start the reading may be issued by the TWAIN driver 302.

After the instruction to start the reading is issued in Step S403, in Step S404, the CPU controller 109 stores the readout image data corresponding to one line in the external information device 150. In Step S405, the CPU controller 109 determines whether a notification of passing of the trailing edge of the original document 200 is received from the sheet detection sensor 203. If the CPU controller 109 determines that a notification of passing of the trailing edge of the original document 200 is not received from the sheet detection sensor 203 (NO in Step S405), the CPU controller 109 waits for a notification of passing of the trailing edge of the original document 200 from the sheet detection sensor 203.

If the CPU controller 109 receives a notification of passing of the trailing edge of the original document 200 from the sheet detection sensor 203 (YES in Step S405), in Step S406, the CPU controller 109 calculates a time when the trailing edge of the original document passes the position the predetermined distance α after the image reading position 202 from the distance between the sheet detection sensor 203 and the image reading position 202 and the paper feed speed in the automatic document feeding device 117. The CPU controller 109 instructs the line image sensor 103 to terminate the reading of the image at the calculated time to terminate the reading at the position the predetermined distance α after the position where the trailing edge of the original document 200 exists. The instruction to terminate the reading may be issued by the TWAIN driver 302.

The image data transmitted from the image reading apparatus 100 to the TWAIN driver 302 in the external information device 150 in accordance with the flowchart in FIG. 4 will now be described with reference to FIGS. 6A and 6B and FIGS. 7A and 7B. Referring to FIGS. 6A and 6B and FIGS. 7A and 7B, outer rectangular areas indicate image data areas read out by the image reading apparatus 100 and hatched rectangular areas inside the image data areas indicate rectangular areas (document image areas) extracted in a step of extracting a document image area in Step S501. Reference numerals P6$a$, P6$b$, P6$c$, P6$d$, P6$a'$, P6$b'$, P6$c'$, P6$d'$, P7$a$, P7$b$, P7$c$, P7$d$, P7$a'$, P7$b'$, P7$c'$ and P7$d'$ denote apices of the respective rectangular areas.

An area of a height 2α from the upper end of the image data area and an area of the height 2α from the lower end of the image data area are set as document-end including areas, and the apices of the rectangular area included in the document-end including areas are considered as the apices of the area of the original document (document image area) to acquire the positions and the number of the apices. The height 2α is determined from the distance α used in Steps S403 and S406 in FIG. 4. Accordingly, the value of the distance α in Steps S403 and S406 is determined in consideration of the estimated amount of inclination of the original document so that the ends of the original document are included in the image data area even if the original document is read out at a tilt.

Figure 6A:
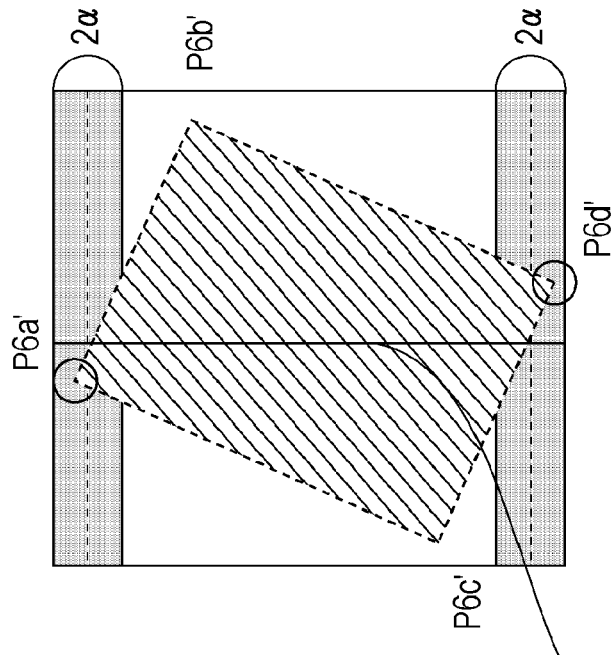
FIGS. 6A and 6B illustrate examples of how to determine the result of image processing according to the embodiment of the present invention.

FIG. 6A shows an example in which the extraction of the document image area succeeds and there is no need to perform an inclination correcting process because the inclination of the document image area relative to the image data area is very small. In such a case, all of the four apices (P6$a$, P6$b$, P6$c$, and P6$d$) of the rectangular area should be included in the document-end including areas.

Figure 6B:
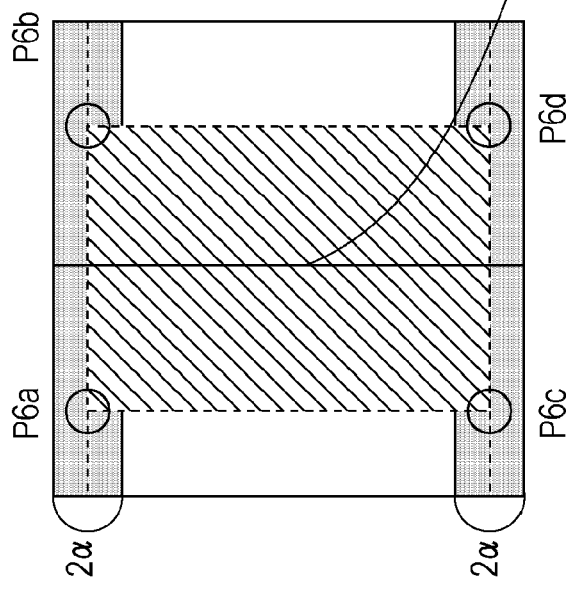

FIG. 6B shows an example in which the extraction of the document image area succeeds but it is necessary to perform the inclination correcting process because the inclination of the document image area relative to the image data area is large. In such a case, at least one apex of the rectangular area should be included in the respective upper and lower document-end including areas. In the example in FIG. 6B, the above condition is satisfied because the apices P6$a'$ and P6$d'$ are included in the document-end including areas. The example in FIG. 6A also satisfies this condition.

FIG. 7A shows an example in which at least one apex of the correct document image area is extracted, among examples in which the extraction of the document image area fails. In such a case, at least one apex of the rectangular area should be included in either of the upper document-end including area and the lower document-end including area and no apex should be included in the remaining document-end including area. In the example in FIG. 7A, the above condition is satisfied because the apex P7$a$ is included in the upper document-end including area but no apex of the rectangular area is included in the lower document-end including area. Dotted areas in FIGS. 7A and 7B are included in the actual document image areas but are not extracted as the document image areas because, for example, the extraction of the edges of the original document failed.

FIG. 7B shows an example in which no apex of the correct document image area is extracted, among the examples in which the extraction of the document image area fails. In such a case, the apices of the rectangular area should be included in neither the upper document-end including area nor the lower document-end including area. In the example in FIG. 7B, the above condition is satisfied because none of the apices P7$a'$, P7$b'$, P7$c'$, and P7$d'$ of the rectangular area are included in the document-end including areas.

FIG. 5 is a flowchart showing an example of a document-image-area extracting process, performed by the TWAIN driver 302. Referring to FIG. 5, in Step S501, the TWAIN driver 302 extracts a document image area actually read out from the image data by the image processing as the rectangular area (document image area) on the basis of the difference in color and/or luminance between the document image area and the background area.

In Step S502, the TWAIN driver 302 determines whether the apices of the extracted rectangular area are included in the document-end including areas in the image data area. If all the four apices of the rectangular area are included in the document-end including areas (YES in Step S502), the rectangular area is correctly extracted so as to be matched with the sheet size of the original document. In Step S511, the TWAIN driver 302 determines whether it is necessary to perform the inclination correcting process on the image data in the rectangular area.

If the TWAIN driver 302 determines that it is not necessary to perform the inclination correcting process on the image data in the rectangular area (NOT NECESSARY in Step S511), the TWAIN driver 302 determines that the correct document image area is extracted as the rectangular area and the inclination of the rectangular area relative to the image data area is negligible. In Step S503, the TWAIN driver 302 cuts out the rectangular area from the image data area as the final image resulting from the reading to output the cutout rectangular area. Then, the document-image-area extracting process is terminated.

If the TWAIN driver 302 determines that it is necessary to perform the inclination correcting process on the image data in the rectangular area (NECESSARY in Step S511), then in Step S505, the TWAIN driver 302 performs the inclination correcting process on the rectangular area. The inclination may be corrected by any of known methods. In Step S503, the TWAIN driver 302 cuts out the rectangular area subjected to the inclination correction from the image data area as the final image resulting from the reading to output the cutout rectangular area. Then, the document-image-area extracting process is terminated.

If the four apices of the rectangular area are not included in the document-end including areas (NO in Step S502), in Step S504, the TWAIN driver 302 determines whether two of the apices of the rectangular area are included in the document-end including areas in the image data area. Specifically, the TWAIN driver 302 determines whether the document image area is correctly extracted as the rectangular area or not.

If the TWAIN driver 302 determines that one apex of the rectangular area is included in the respective upper and lower document-end including areas (YES in Step S504), the TWAIN driver 302 determines that the correct document image area is extracted as the rectangular area but the rectangular area is inclined relative to the image data area. Specifically, the TWAIN driver 302 determines that the original document is read out at a tilt. In Step S505, the TWAIN driver 302 performs the inclination correcting process on the rectangular area. In Step S503, the TWAIN driver 302 cuts out the rectangular area subjected to the inclination correction from the image data area as the final image resulting from the reading to output the cutout rectangular area. Then, the document-image-area extracting process is terminated.

The cutout rectangular area is printed out on a sheet of paper. However, the cutout rectangular area may be converted into a format allowing storage in the HDD 157 in the external information device 150 to be output to the external information device 150, instead of being printed out.

If both of the two apices of the rectangular area are included in either of the upper document-end including area and the lower document-end including area (YES in Step S504), the distance between the two apices can be compared with the width of a standard sheet size to uniquely determine the document image area, which corresponds to the size of the original document. If the width of no standard sheet size coincides with the distance between the two apices, the detection of the standard sheet size fails and, thus, the sheet size of the original document cannot be identified. Also if a standard sheet size having the width coinciding with the distance between the two apices is found but the two apices at the side where reference apices do not exist are not included in the document-end including area when the document image area of the standard sheet size is actually applied, it is determined that the detection of the standard sheet size fails and the original document is not matched with the standard sheet size. When the original document is not matched with the standard sheet size, a rectangular area in which two apices included in the document-end including area are set as the reference apices and the remaining two apices are included in the document-end including area opposite the document-end including area where the reference apices exist is set as the document image area.

As described above, optimal rectangular areas (document image areas) can be determined stepwise by using the number of apices existing in the document-end including areas to effectively determine the result of the automatic extraction of the document image area by the image processing. At the same time, if only two apices are included in the document-end including areas, it is also possible to determine whether the inclination correcting process is necessary on the basis of the position(s) of the document-end including area(s) including the apices. When it is determined that the inclination correcting process is not necessary, the resulting image can be output without the inclination correcting process to increase the processing speed. For example, if all the four apices are included in the document-end including areas, it may be determined that the inclination of the original document is at a level requiring no inclination correction and the inclination correcting process may not be performed. In this case, the determination in Step S502 may not be performed and only the determination in Step S504 may be performed to determine the rectangular area and perform the inclination correcting process.

If the TWAIN driver 302 determines that one apex of the rectangular area (the document image area) is not included in the respective upper and lower document-end including areas or two apices of the rectangular area (the document image area) are included in neither the upper document-end including area nor the lower document-end including area (NO in Step S504), the TWAIN driver 302 determines that the correct document image area is not extracted as the rectangular area and performs a document-image-area estimating process to correct the rectangular area to an area having the size coinciding with a sheet size that is probably more correct. The document-image-area estimating process is varied depending on how the rectangular area is extracted. Specifically, the following steps are performed.

In Step S506, the TWAIN driver 302 determines whether one apex of the rectangular area is included in either of the document-end including areas in the image data area in order to determine whether the document size can be detected by using standard sheet sizes.

If the TWAIN driver 302 determines that the document size can be detected by using the standard sheet sizes (YES in Step S506), then in Step S507, the TWAIN driver 302 determines whether a matched standard sheet size is detected.

FIG. 8 illustrates an example of how the document-image-area estimating process is performed in Step S507 on the basis of detection of a matched standard sheet size when the extraction of the document image area fails but at least one apex is correctly extracted. Referring to FIG. 8, an outer rectangular area indicates an image data area read out by the image reading apparatus 100, and a hatched rectangular area inside the image data area indicates a rectangular area (document image area) extracted in the step of extracting a document image area in Step S501. Reference numerals P8a, P8b, P8c, and P8d denote the apices of the rectangular area.

An area of the height $2\alpha$ from the upper end of the image data area and an area of the height $2\alpha$ from the lower end of the image data area are set as the document-end including areas, and the apices of the rectangular area included in the document-end including areas are considered as the apices of the document image area that is correctly extracted. The height $2\alpha$ is determined from the distance $\alpha$ used in Steps S403 and S406 in FIG. 4. Since the apex P8a of the rectangular area is included in the upper document-end including area, it is determined that the apex P8a is an apex of the correct document image area. In contrast, since the apex P8c diagonally opposing the apex P8a is not included in the lower document-end including area, it is determined that the apex P8c is not an apex of the correct document image area. In the method in FIG. 8, the apex P8a included in the document-end including area is set as the reference apex to determine whether a standard sheet size exists in which the reference apex corresponds to one apex and the apex diagonally opposing the reference apex is included in the document-end including area when the document image area of the standard sheet size is applied so as to include the entire rectangular area.

First, a rectangular area when the area of standard B5 sized paper is applied so as to satisfy the above condition is represented using apices P8a, P8b', P8c', and P8d'. Since the apex P8c' diagonally opposing the apex P8a is not included in the document-end including area in this rectangular area, this rectangular area is determined to be unmatched.

Next, a rectangular area when the area of standard A4-sized paper is applied so as to satisfy the above condition is represented using apices P8a, P8b'', P8c'', and P8d''. Since the apex P8C'' diagonally opposing the apex P8a is included in the document-end including area in this rectangular area, this rectangular area is determined to be matched.

If a matched standard sheet size is found as the result of the application of the document image areas of various standard sheet sizes in the above manner, it is determined that the method in FIG. 8 results in the extraction of the correct document image area. If a matched standard sheet size is not found, it is determined that the method in FIG. 8 does not result in the extraction of the correct document image area. Accordingly, if at least one apex of the rectangular area is correctly extracted and the size of the document image area that is actually read out corresponds to a standard sheet size when the step of extracting a document image area in Step S501 fails, the document image area the extraction of which fails in the step of extracting a document image area in Step S501 can be recovered with the method in FIG. 8.

Referring back to FIG. 5, if a matched standard sheet size is detected (SUCCESS IN DETECTION in Step S507), then in Step S508, the TWAIN driver 302 performs the correction so that a new rectangular area has the matched standard sheet size.

In Step S505, the TWAIN driver 302 performs the inclination correcting process on the corrected rectangular area. In Step S503, the TWAIN driver 302 cuts out the rectangular area subjected to the inclination correction from the image data area as the final image resulting from the reading to output the cutout rectangular area. Then, the document-image-area extracting process is terminated.

If the TWAIN driver 302 determines that a matched standard sheet size is not detected (FAILURE IN DETECTION in Step S507), the process goes to Step S509.

FIG. 9 illustrates an example of how the document-image-area estimating process is performed in Step S509. Referring to FIG. 9, an outer rectangular area indicates an image data area read out by the image reading apparatus 100, and a hatched rectangular area inside the image data area indicates a rectangular area (document image area) extracted in the step of extracting a document image area in Step S501. Reference numerals P9a, P9b, P9c, and P9d denote the apices of the rectangular area. A rectangular area that has a check pattern and that is inside the image data area indicates a rectangular area subjected to the correction by the method in FIG. 9. Reference numerals P9a, P9b', P9c', and P9d' denote the apices of the rectangular area subjected to the correction.

An area of the height $2\alpha$ from the upper end of the image data area and an area of the height $2\alpha$ from the lower end of the image data area are set as the document-end including areas, and the apices of the rectangular area included in the document-end including areas are considered as the apices of the document image area that is correctly extracted. The height $2\alpha$ is determined from the distance a used in Steps S403 and S406 in FIG. 4.

If a matched standard sheet size is not detected in Step S507, the readout document probably has an undefined size. However, since the rectangular area does not apparently coincide with the correct document image area, a new rectangular area having a size more similar to the sheet size of the original document is estimated from the rectangular area and information about the image data.

In the method in FIG. 9, the apex P9a included in the document-end including area is used as the reference apex and the rectangular area is enlarged so that the apex diagonally opposing the reference apex is included in the document-end including area. Since the apex P9a is included in the upper document-end including area in the example in FIG. 9, the position of the apex P9c diagonally opposing the apex P9a is moved to a position (for example, the position of the apex P9c') included in the lower document-end including area. However, since the enlarged rectangular area cannot be uniquely determined under the above condition, a condition that the aspect ratio of the rectangular area is equal to the aspect ratio of A-sized paper is added as the condition for the enlargement so that the rectangular area is uniquely determined. A condition that the aspect ratio of the rectangular area is equal to the aspect ratio of B-sized paper may be added as the condition for the enlargement, or another condition may be set as long as the rectangular area is uniquely determined.

Referring back to FIG. 5, in Step S509, the TWAIN driver 302 estimates a rectangular area and corrects the rectangular area to use the area resulting from the estimation as a new rectangular area.

In Step S505, the TWAIN driver 302 performs the inclination correcting process on the rectangular area. In Step S503, the TWAIN driver 302 cuts out the rectangular area subjected to the inclination correction from the image data area as the final image resulting from the reading to output the cutout rectangular area. Then, the document-image-area extracting process is terminated.

If the TWAIN driver 302 determines that the document size cannot be detected by using standard sheet sizes (NO in Step S506), the process goes to Step S510.

FIG. 10 illustrates an example of how the document-image-area estimating process is performed in Step S510 when the extraction of the document image area fails and no apex of the document image area is correctly extracted. Referring to FIG. 10, an outer rectangular area indicates an image data area read out by the image reading apparatus 100, and a hatched rectangular area inside the image data area indicates a rectangular area (document image area) extracted in the step of extracting a document image area in Step S501. Reference numerals P10a, P10b, P10c, and P10d denote the apices of the rectangular area. A rectangular area that has a check pattern and that is inside the image data area indicates a rectangular area subjected to the correction by this method. Reference numerals P10a', P10b', P10c', and P10d' denote the apices of the rectangular area subjected to the correction.

An area of the height $2\alpha$ from the upper end of the image data area and an area of the height $2\alpha$ from the lower end of the image data area are set as the document-end including areas, and the apices of the rectangular area included in the document-end including areas are considered as the apices of the document image area that is correctly extracted. The height $2\alpha$ is determined from the distance $\alpha$ used in Steps S403 and S406 in FIG. 4.

If no apex of the rectangular area exists in the document-end including areas as in the rectangular area in FIG. 10, it is not possible to apply a standard sheet size with the correctly extracted apex used as the reference apex. However, since the rectangular area does not apparently coincide with the correct document image area, a new rectangular area having a size more similar to the sheet size of the original document is estimated from the rectangular area and information about the image data.

In the method in FIG. 10, the rectangular area is enlarged to a new rectangular area so that at least one apex is included in the respective upper and lower document-end including areas (for example, a rectangular area having apices P10a', P10b', P10c', and P10d' in FIG. 10). However, since a new rectangular area cannot be uniquely determined under the above condition, a condition that the aspect ratio of the rectangular area is equal to the aspect ratio of A-sized paper and a condition that the coordinate of the centroid of the rectangular area coincides with the coordinate of the centroid of a new rectangular area in the lateral direction in FIG. 10, that is, in the direction orthogonal to the document feeding direction are added so that the rectangular area is uniquely determined. A condition that the aspect ratio of the rectangular area is equal to the aspect ratio of B-sized paper may be adopted, or other conditions may be set as long as the rectangular area is uniquely determined.

Referring back to FIG. 5, in Step S510, the TWAIN driver 302 estimates a rectangular area and corrects the rectangular area to use the area resulting from the estimation as a new rectangular area.

In Step S505, the TWAIN driver 302 performs the inclination correcting process on the rectangular area. In Step S503, the TWAIN driver 302 cuts out the rectangular area subjected to the inclination correction from the image data area as the final image resulting from the reading to output the cutout rectangular area. Then, the document-image-area extracting process is terminated.

According to a second embodiment of the present invention, if no apex of the rectangular area is included in the document-end including areas, a length L of the image data in the document feeding direction is calculated from the number of lines in the image data and the length L is used to estimate a rectangular area before Step S501 in FIG. 5. The method of the second embodiment will now be described with reference to FIG. 5.

Since Steps S501 to S508 are the same as in the first embodiment, a description of Steps S501 to S508 is omitted herein. According to the second embodiment, before Step S501, the TWAIN driver 302 calculates the length of the image data in the document feeding direction from the reading resolution that is set for the image reading apparatus 100 when the reading instruction is transmitted in Step S400 and the number of lines in the image data.

If no apex of the rectangular area is included in the document-end including areas, in the document-image-area estimating process in Step S510, the length of the image data in the document feeding direction is determined to be the longitudinal length of the original document, the width is determined so as to coincide with the aspect ratio of A-sized paper, and an area having the width determined from the image data is determined to be the rectangular area. If center alignment is adopted in the automatic document feeding device, an area having the width measured from the center of the image data is cut out. If left alignment or right alignment is adopted in the automatic document feeding device, an area having the width measured from the left end or the right end of the image data is cut out, respectively.

According to a third embodiment of the present invention, the processing in the above embodiments is performed by the image reading apparatus 100. In this case, the image that is read out is stored in the buffer memory 107 in the image reading apparatus 100. The control of the processing, the determination processing, etc. are performed in the CPU controller 109, the image processing circuit 106, and the working memory 114.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-314616 filed on Dec. 10, 2008, which is hereby incorporated by reference herein in its entirety.

What is claimed is:

1. An image processing apparatus for processing image data obtained by an image reading apparatus that includes a reading unit which reads an image on a document and a document feeding unit which feeds the document to an image reading position in the reading unit, the image processing apparatus comprising:
    an obtaining unit which obtains image data including a whole document image read by the image reading apparatus by causing the document feeding unit to feed the document and causing the reading unit to read an image on the fed document based on a detection of a leading end and a trailing end of the fed document;
    an extracting unit which extracts a rectangular area indicating a document image area of the document from the image data obtained by the obtaining unit;
    an acquiring unit which acquires the number of apices of the rectangular area included in specific areas including a leading end and a trailing end of the image data; and
    a determining unit which determines whether the extracted rectangular area corresponds to the document image area in accordance with the number acquired by the acquiring unit.

2. The image processing apparatus according to claim 1, further comprising:
    an inclination correcting unit which corrects an inclination of the document image in accordance with the number acquired by the acquiring unit.

3. The image processing apparatus according to claim 1, further comprising a modifying unit which modifies the extracted rectangular area in accordance with the number acquired by the acquiring unit.

4. The image processing apparatus according to claim 3, further comprising a comparing unit which compares the extracted rectangular area with a predetermined size, wherein the modifying unit modifies the extracted rectangular area in accordance with a comparison result of the comparing unit.

5. A method for processing image data obtained by an image reading apparatus that includes a reading unit which reads an image on a document and a document feeding unit feeding which feeds the document to an image reading position in the reading unit, the method comprising:

obtaining image data including a whole document image read by the image reading apparatus by causing the document feeding unit to feed the document and causing the reading unit to read an image on the fed document based on a detection of a leading end and a trailing end of the fed document;

extracting a rectangular area indicating a document image area of the document from the obtained image data;

acquiring the number of apices of the rectangular area included in specific areas including a leading end and a trailing end of the image data; and determining whether the extracted rectangular area corresponds to the document image area in accordance with the acquired number.

6. A non-transitory computer-readable storage medium storing a computer-executable program for executing a method for processing image data obtained by an image reading apparatus that includes a reading unit which reads an image on a document and a document feeding unit which feeds the document to an image reading position in the reading unit, the method comprising:

obtaining image data including a whole document image read by the image reading apparatus by causing the document feeding unit to feed the document and causing the reading unit to read an image on the fed document based on a detection of a leading end and a trailing end of the fed document;

extracting a rectangular area indicating a document image area of the document from the obtained image data;

acquiring the number of apices of the rectangular area included in specific areas including a leading end and a trailing end of the image data; and determining whether the extracted rectangular area corresponds to the document image area in accordance with the acquired number.

\* \* \* \* \*